INVENTOR
JOHN A. NARDONTONIA
BY
Hopgood & Calimafde
ATTORNEYS.

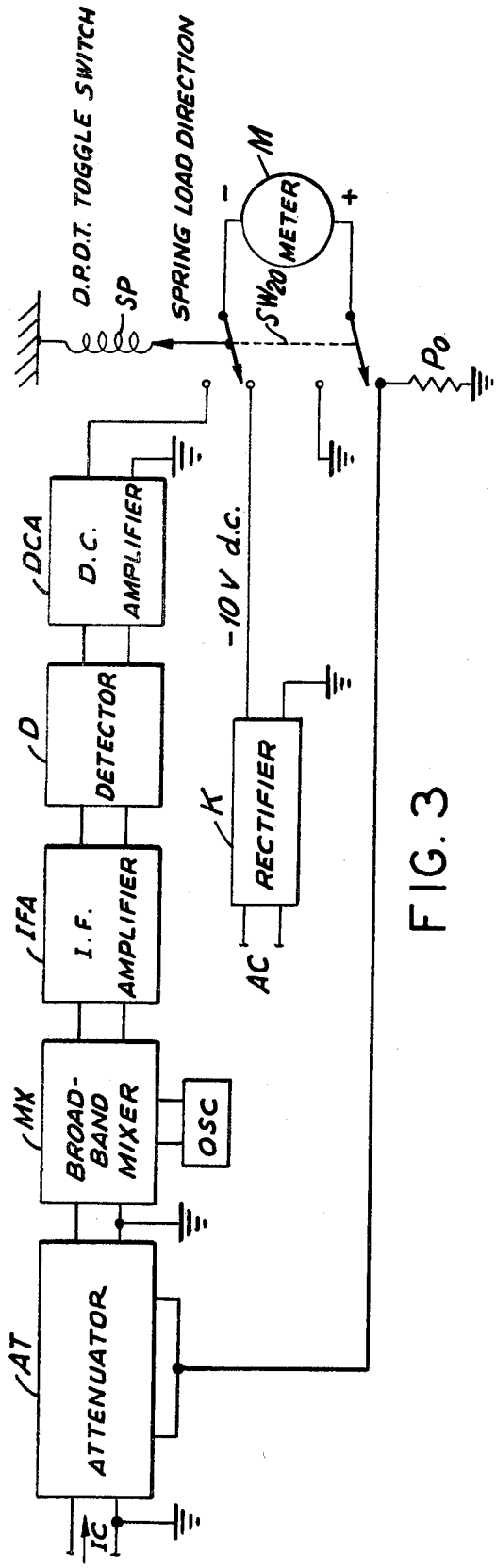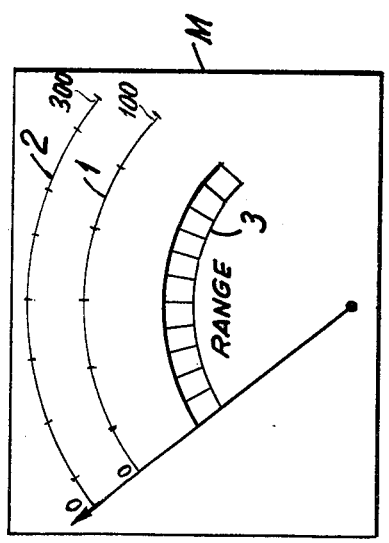

United States Patent Office 3,479,592
Patented Nov. 18, 1969

3,479,592
FIELD STRENGTH METERS HAVING A PLURALITY OF SCALES AND INCLUDING MEANS FOR INDICATING THE SCALE TO BE OBSERVED AND THE MULTIPLYING FACTOR TO BE APPLIED
John A. Nardontonia, Pennsauken, N.J., assignor to Jerrold Electronics Corporation, Philadelphia, Pa., a corporation of Delaware
Filed Aug. 23, 1966, Ser. No. 574,355
Int. Cl. G01r 1/38, 15/08
U.S. Cl. 324—115      4 Claims

ABSTRACT OF THE DISCLOSURE

A field intensity meter is described wherein the intensity of an A.C. wave is easily determined by selectively interposing selected attenuators in series with the wave and in synchronism with said interposition adjust a resistive network. The resistive network and the attenuated detected A.C. wave being alternately applied to a meter for respectively indicating a multiplication factor and the relative intensity level of the A.C. wave.

---

Figure 1:
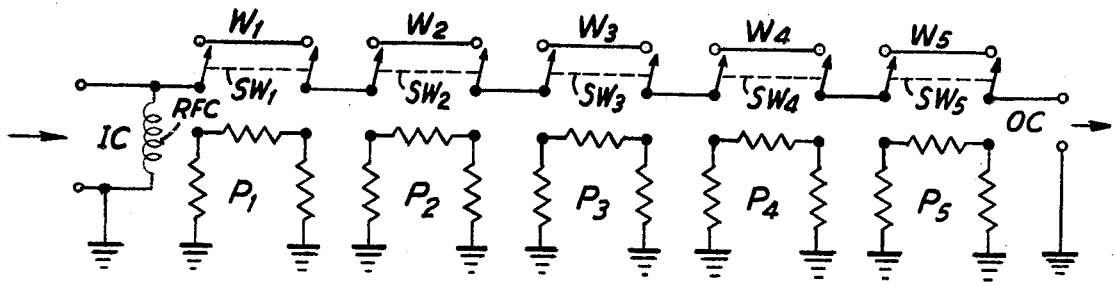

This invention relates to testing and measuring apparatus and, more particularly, to testing and measuring apparatus for determining the strength of electromagnetic waves and their electromagnetic fields.

In connection with the installation of an antenna for communication equipment, for example, it is frequently desirable to determine the field strength of waves which are to be received by the antenna at its desired location. Such measurements have heretofore been made by what has been known as field strength measuring equipment. In general, such equipment would include a form of tunable radio receiving set of considerable sensitivity and designed to be adjustable to select the alternating currents of frequencies, which may be in widely different ranges, that are to be received at the location and to determine, with the use of a meter connected to its output, the strength of any selected waves at that location.

Because of the numerous widely spaced broad bands of frequencies that may have to be examined for field strength, various expedients have been devised to facilitate the testing functions. Such expedients have been made necessary by the limitations of the meter scale and by the adjustments of attenuators and other devices often associated with the testing equipment. Such items had to be manipulated to bring the waves within the range of the scale of the meter of the testing equipment. These expedients have included, among others, special meter scales to be superimposed over the usual scale of the meter of the receiving equipment, and other scales to be used as adjuncts of the usual scale for facilitating the reading of the field strength. The design of such equipments was often geared to the operator's ability and training to make the physical adjustments and to do the necessary mental or written calculations, all for the purpose of making the field strength measurements. The various expedients were also intended to increase the flexibility of the measuring equipment so that all of the widely differing frequencies to be examinable by the operator were within the range of operation of the equipment and so that the operator could readily finalize his investigation and fix the field strength of unknown waves with accuracy.

These prior art techniques have resulted in rather complicated testing and measuring equipments, especially for field test measurements over broad bands of frequencies. They have made the work of the operator quite difficult, sometimes impossible for inexperienced testmen. It has been necessary, therefore, to employ specially trained personnel of good mental attainments for such types of services. As another factor, these techniques have resulted in slowing up the testing procedures and, in addition, the testing services were inefficient as well as expensive.

It is, therefore, an object of this invention to provide a testing and measuring equipment, especially one suitable for field strength measurements, that definitely simplifies the necessary procedures and results in faster and more efficient and less costly testing services.

Figure 2:
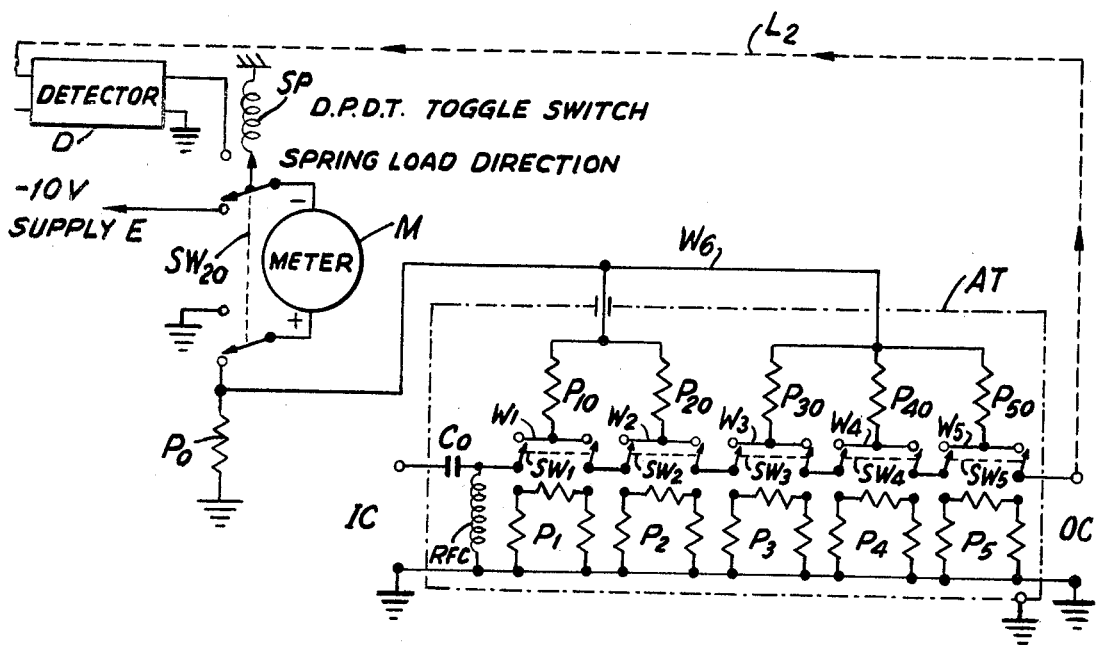
Figure 4:
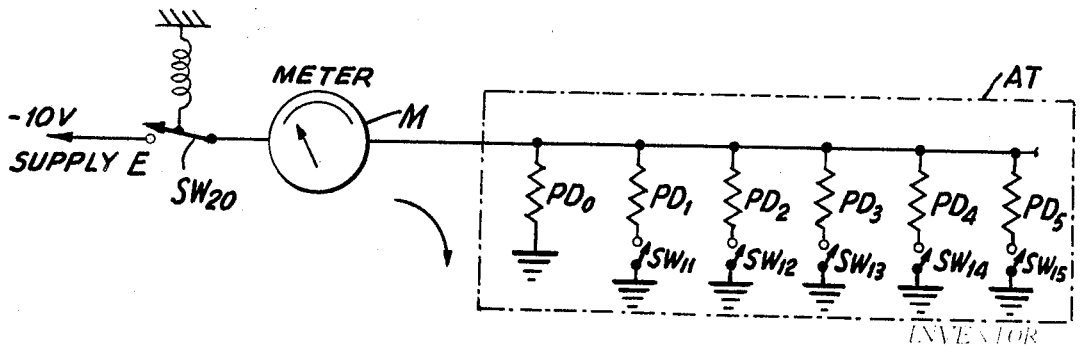

This invention will be better understood from the following description when considered in connection with the accompanying drawing in which FIG. 1 represents schematically one form of step attenuator which is usable in this invention; FIG. 2 represents schematically a form of attenuator sampling and switching circuit for carrying out this invention; FIG. 3 shows schematically a block diagram of the main components for practicing this invention; FIG. 4 illustrates schematically the sampling features when applied to a constant current source of direct current voltage which supplies current of a frequency far removed from those frequencies ordinarily to be examined by the equipment of this invention; FIG. 5 illustrates, in general, certain ranges of the scale that would be part of the meter of this invention; and FIG. 6 illustrates other features of the measuring properties of this invention.

Referring to FIG. 1 of the drawing, there is shown an input circuit IC and an output circuit OC which are coupled to each other by a step attenuator consisting of five pads P1, P2, P3, P4 and P5 which may be, for example, of the $\pi$ type. Double-poled, double-throw switches SW1, SW2, SW3, SW4 and SW5 are associated with these pads P1 to P5, respectively. These switches, when moved in one direction, i.e., down, serve to connect into the attenuator network all of the associated pads P1–P5, and, when moved in the other direction, i.e., up, connect conductors W1, W2, W3, W4 and W5 in series into the network and effectively remove the pads P1–P5 from the network. The input circuit IC is bridged by a radio frequency coil RFC, its lower terminal being grounded. The input circuit IC and the output circuit OC, may be bridged across circuits (not shown) preferably having substantially constant impedances which may be equal to each other in magnitude.

Thus, the operator, by moving switch SW1 down and leaving the remaining switches in their upper positions, will insert the pad P1 alone into the network for attenuating signals or waves received by the input circuit IC for transmission to the output circuit OC. By moving both switches SW1 and SW2 into their down positions, then the respective associated pads P1 and P2 will be inserted in tandem in the network between input and output circuits. Likewise, when all of the switches SW1 to SW5 are in their down positions, all of the pads P1 to P5 will be inserted in tandem into the network and the attenuator will introduce its maximum attenuation between input and output circuits. Hence, the operator may insert any desired attenuation into the network to attenuate incoming waves by any desired amount.

FIG. 2 shows schematically a so-called sampling and switching circuit for an attenuator AT of the kind shown in FIG. 1. Here the components of the attenuator which may be the same as those of FIG. 1, are represented by like reference characters. The input circuit IC of attenuator AT is connected to the radio frequency coil RFC by a condenser $C_0$. Resistors P10, P20, P30, P40 and P50 connect conductors W1, W2, W3, W4 and W5, respectively, to conductor W6. Conductor W6 is connected to one terminal of resistor $P_0$, the other terminal of which is grounded.

The output circuit OC of attenuator AT is shown connected by a dotted line L2 to a detector D which is preferably a device for rectifying incoming waves to be examined and for amplifying the rectified currents. The circuitry between attenuator AT and detector D will be described generally in connection with FIG. 3.

FIG. 2 also shows a meter M which is connected by a double-pole, double-throw switch SW20 to a source of negative DC voltage E when the switch is in its lower position, and to the detector D when the switch SW20 is in its upper position. The switch SW20 is preferably of the spring-loaded toggle type so that it may be depressed by the operator whenever desired but will be instantly released due to the action of its spring SP when the operator removes his hand from the switch. When the switch SW20 is released, the operator may obtain a reading on the scale of the meter M by appropriate adjustment of the several switches SW1 to SW5 of the attenuator, as will be further explained. However, when he depresses the switch SW20, the pointer of the meter will immediately indicate the scale of the meter M which is to be observed by the operator in visually determining the field strength of a selected incoming wave attenuator by attenuator AT and detected by detector D.

FIG. 3 shows schematically in block form the essential components of the field strength measuring set of this invention. The input circuit IC of the attenuator AT may be connected to a circuit (not shown) for receiving known or unknown electromagnetic waves, which circuit may include, for example, an antenna, a radio frequency detector or demodulator and an amplifier, all of well-known construction. The attenuator AT is in turn connected to a broad band demorulator or mixer MX, the mixer being also connected to a local beating oscillator OSC. As is well known, the mixer combines the incoming waves after they have been attenuated by the attenuator AT, with the locally generated waves supplied by oscillator OSC. The resulting products of the mixer MX are amplified by the intermediate frequency amplifier IFA which in turn is connected to the detector D. The output of the detector is amplified by the DC amplifier DCA. The amplified current is a direct current which, according to this invention is readily measurable on the scale of the meter M no matter how much attenuation is inserted by attenuator AT.

When the switches SW1 to SW5, shown in some detail in FIGS. 1 and 2, are in their upward positions, the attenuator AT will present a minimum of attenuation to incoming waves which have been selected. This will be reflected by a reading of the pointer of the meter M on one of the scales of meter M. However, when one of the switches is in its lower position, for example, the pointer of the meter will necessarily indicate a smaller deflection or reading for a wave of the same general field strength due particularly to the increased attenuation inserted into the path of the wave.

The pad P1 may be, for example, a 10 db pad, and pads P2 to P5 may be, for example, 20 db pads. The insertion of pad P2 alone into the attenuator, accomplished by moving switch SW2 to its lower position, will result in inserting a 20 db attenuation into the network. This will result in changing the full-scale value of meter M from one value to another, for example, from 100 mv. to 1,000 mv. By inserting pad P3 into the network, the attenuation will be increased to, for example, 40 db, and the full-scale valuation will in turn be changed to 10,000 mv. The successive additions of pads P4 and P5 will increase the inserted attenuation to 100,000 mv. and 1,000,000 mv. respectively. These pads may have any predetermined attenuations and any desired number of pads may be used in practice.

Furthermore, the pad P1 may be a small pad, for example, a 10 db pad. Such a pad will serve to provide a scale-multiplying factor of 3. Thus, when pad P1 alone is inserted into the network, the scale which, in the example, had a full-scale value of 100 mv., would be changed to 300 mv. By adding pad P2 to pad P1 in the network, the full-scale reading would become 3,000 mv. And so on.

FIG. 5 shows one form of dial for the meter M of this invention. Scale 1 may be calibrated from 0 to 100 and such a scale would serve as a normal full scale for the meter to be used at its maximum sensitivity when, for example, all of the pads P1 to P5 of attenuator AT were disconnected from the network. This scale 1 would then directly indicate a field strength of an incoming wave, for example, in microvolts. Scale 2, the uppermost scale, may be calibrated to extend from 0 to 300. Such a scale would be normally usable when pad P1 is inserted into an attenuator network, i.e., when pad P1 is inserted into the network either alone or with other of the attenuator pads. The upper scale 2 would be usable to measure the field strength of any incoming wave when, at the least, pad P1 was connected into the attenuator network.

It will be apparent that scales 1 and 2, while sufficient for many purposes, however, are inadequate when the field strength of a wave to be measured is so great as to cause the pointer of the meter M to reach its upper limit at the right hand side of the scales. In that event, the additional pads P2 to P5 would have to be inserted into the attenuator network so as to cause the pointer of the meter M to be confined to the observable limits of the scales 1 and 2.

The operator may be sufficiently skilled and trained so as to be fully cognizant of the switches SW1 to SW5 which have been moved into their lower positions to insert appropriate attenuation into the attenuator AT, and he may also be aware of the scale-multiplying factors inherent in the switches that have been manipulated by him. However, the chances of misreading the meter have been reduced to a practical nullity by the addition of the spring-loaded switch SW20 and its related circuitry in the practice of this invention. By depressing switch SW20 shown in FIGS. 2 and 3, the operator will instantly cause the pointer of meter M to swing into the range of the scale 3 of meter M so as to enable the operator to determine by observation the scale of the meter M upon which the level of an incoming A.C. wave is to be read. The scale 3 indicates implicitly the multiplying factor introduced by the equipment for the purposes of the measurement.

Thus, when none of the switches SW1 to SW5 are operated, scale 1 of FIG. 5 is the only scale which would be properly readable for measuring the field strength of an incoming selected wave. This condition is readily observed upon closing switch SW20. When switch SW20 is closed, the pointer of the meter M will move into the range of scale 3 at the extreme right and indicate to the operator that scale 1 is the proper scale for readings. Similarly, when pad P1 alone is added to the circuit due to the operation of switch SW1, the pointer of the meter M will swing to the right to indicate, by its position on scale 3, that a different scale is to be used. In this case, scale 2 may be used for the field strength determination of the wave under observation. Furthermore, when switch SW2 is alone operated, a 20 db pad of attenuator AT will be inserted into the network. This condition of attenuation also will be revealed by manipulation of switch SW20. In this latter case, the pointer of meter M will move to the right on scale 3 into a different predetermined region of field strength measurement. This will require the operator to use scale 1 to observe the field strength value. The maximum reading on scale 1 will then be 1,000 mv., for example, instead of 100 mv., and so on for the operation of any other combinations of switches SW1 to SW5.

It will be especially noted that no miscellaneous charts of scale factors nor any color codings for any of the switches or for any of the scales of meter M are employed in the use of the field strength measuring instrument of this invention. The instrument is complete in itself without any chart addenda. This simplifies the operation of the instrument and complete accuracy is more easily attainable.

FIG. 4 shows a simplified schematic arrangement to explain the sampling action of this invention. Here the source of DC voltage E is shown applied to a schematic circuit of the attenuator network AT through switch SW20. The completion of this circuit will have no substantial effect upon the impedance of the attenuator network. At the same time the current used (a zero frequency current) is so far removed from the operating frequencies to be examined by the instrument as to have no adverse effect upon the instrument.

The source E may be connected, as shown, by switch SW20 to the meter M and to the various grounded resistors PD0, PD1, PD2, PD3, PD4, PD5. Switches SW11 to SW15, inclusive, correspond to the switches SW1 to SW5, respectively, of the attenuator network shown in FIGS. 2 and 3. Switches SW11 to SW15 are shown open in FIG. 4 to indicate that the corresponding switches SW1 to SW5 of FIGS. 2 and 3 are closed. In other words, each switch of the attenuator AT that is closed in FIGS. 2 and 3 is represented by an open switch in FIG. 4.

When all of the switches of the attenuator network are operated, that is, when switches SW1 to SW5 are in their lower positions, switches SW11 to SW15, as shown in FIG. 4, will be opened. Under these conditions, the total current flowing through the meter M will be at this minimum value which may be, for example, 20 microamps. On the other hand, when all of the switches SW1 to SW5 are released, that is, when switches SW1 to SW5 are in their upper positions, switches SW11 to SW15 of FIG. 4 will be closed. Then the current through meter M will be at its greatest magnitude, or about 200 microamps.

The combination of meter M, the attenuator AT, the source of D.C. voltage E and switch SW20 constitute an essential arrangement of this invention. Meter M measures the flow of current from source E through attenuator AT when switch SW20 is operated. When all of the pads of attenuator AT are inserted, as would be the case when all switches SW1 to SW5 are down, the current through meter M will be a minimum (20 microamps). But when all switches SW1 to SW5 are up, the current through meter M will be a maximum (200 microamps). As fewer switches are operated, the current through meter M will receive a smaller current, a current which is always commensurate with the particular switches, or the number of switches, that have been operated. Hence, the pointer of meter M will in effect indicate the relative magnitude of attenuation of attenuator AT that is interposed into the path of meter M. The resulting, full scale reading, caused by the various sections of attenuator AT being interposed into the circuit, is revealed by actuation of switch SW20. Furthermore, this switch releases instantly after the operator removes his hand from the switch. The operator may then promptly read the strength of the applied A.C. wave from the position of the pointer of meter M.

The operator using the instrument of this invention would be instructed (1) to manipulate the switches SW1 to SW5 of the attenuator AT to obtain an on-scale indication on meter M, and (2) to depress switch SW20 and find, from observing scale 3, which of the scales 1 or 2 is to be used for reading the incoming wave level. By releasing switch SW20, the operator would determine the level of the incoming wave on the appropriate scale 1 or 2.

This invention is predicated upon the use of a D.C. voltage as a yardstick for determining quickly how much attenuation has been inserted to oppose the flow of any alternating current through a measuring instrument. There is no comparison of one alternating current with another similar alternating current. Consequently, interference and confusion are obviated. This is an important feature.

While this invention has been shown as applied to field strength testing and measuring equipment employing certain kinds of resistive pads of predetermined magnitudes, it will be obvious that the general principles of this invention are equally applicable to other forms of equipment, whether or not for testing or measurement, and are equally applicable to pads of different compositions and widely different magnitudes.

While this invention has been shown as applied to in certain particular arrangements merely for illustration, it will be apparent that the principles of this invention may be applied to other and widely varied organizations without departing from the spirit of the invention and the scope of the appended claims.

What is claimed is:

1. A test equipment for determining the intensity level of an A.C. wave comprising:
   a plurality of attenuators of preselected magnitudes, said attenuators being selectively interswitchable in series with the A.C. wave for attenuation thereof,
   meter means including a plurality of scales and a detector and responsive to the attenuated A.C. wave for displaying an indication of the relative intensity level of the attenuated wave,
   a voltage source,
   a plurality of resistors of preselected resistive magnitudes proportional to the attenuator magnitudes,
   means actuated in synchronism with the series insertion of the attenuators for arranging the selected resistors in correspondence with the series inserted attenuators and provide a composite resistance having a magnitude proportional to the total attenuation placed in series with the A.C. wave,
   switch means for selectively coupling the voltage source and the composite resistance to the meter means for displaying an indication of the scale applicable to the relative A.C. wave intensity indication to obtain an absolute intensity level indication of the A.C. wave.

2. The device according to claim 1 in which said switch means includes a depressable spring-loaded switch normally interconnecting the attenuators to the meter means and when depressed interconnects said composite resistance to the meter means.

3. The device as recited in claim 1 wherein said meter means includes a meter for indicating the level of said A.C. wave, said meter having a plurality of scales corresponding to different intensity ranges of said A.C. wave and a scale level indication.

4. Testing equipment comprising a receiver for receiving and detecting an A.C. wave of unknown strength, a meter connected to said receiver for responding to the detected wave, said meter having first scale for indicating the relative intensity level of said A.C. wave, and a second scale for indicating a multiplication factor to be applied to the indication on the first scale, attenuation means coupled to said receiver for selectively attenuating the A.C. wave, a source of D.C. voltage, and resistive means coupled to said voltage source and said attenuation means and actuated in synchronism with the attenuation means for producing a signal representative of the multiplication factor to be applied to the meter.

References Cited

UNITED STATES PATENTS

| | | | |
|---|---|---|---|
| 2,802,181 | 8/1957 | Gorski | 324—115 XR |
| 2,874,354 | 2/1959 | Bell | 324—115 XR |
| 2,919,401 | 12/1959 | Cole et al. | 324—130 XR |
| 3,052,844 | 9/1962 | Varterasian | 324—115 XR |
| 3,070,746 | 12/1962 | Moore et al. | 324—115 XR |
| 3,102,981 | 9/1963 | Pulliam | 324—130 XR |
| 3,181,063 | 4/1965 | Ullrich | 324—130 XR |
| 3,305,769 | 2/1967 | Julie | 324—115 |

GERARD R. STRECKER, Primary Examiner

U.S. Cl. X.R.

324—130